May 1, 1951 — H. I. MORRIS — 2,550,710
ELECTRICAL WELDING APPARATUS
Filed Nov. 24, 1945 — 6 Sheets-Sheet 1

INVENTOR.
HOWARD I. MORRIS.
BY Geo. B. Pitts
ATTORNEY.

May 1, 1951          H. I. MORRIS          2,550,710

ELECTRICAL WELDING APPARATUS

Filed Nov. 24, 1945          6 Sheets-Sheet 2

INVENTOR.
HOWARD I. MORRIS.

BY

*Geo. B. Fitts*

ATTORNEY.

May 1, 1951        H. I. MORRIS        2,550,710

ELECTRICAL WELDING APPARATUS

Filed Nov. 24, 1945        6 Sheets—Sheet 5

INVENTOR.
HOWARD I. MORRIS.
BY Geo. B. Pitts
Attorney

May 1, 1951 H. I. MORRIS 2,550,710
ELECTRICAL WELDING APPARATUS
Filed Nov. 24, 1945 6 Sheets-Sheet 6

INVENTOR.
HOWARD I. MORRIS.
BY
Geo. B. Pitts
ATTORNEY.

Patented May 1, 1951

2,550,710

UNITED STATES PATENT OFFICE 2,550,710

ELECTRICAL WELDING APPARATUS

Howard I. Morris, San Marcos, Calif., assignor, by direct and mesne assignments, of one-third to Harvey O. Yoder, Lakewood, Ohio, and one-third to Douglas O. Yoder, Bay Village, Ohio, and Mildred Yoder Kanzenbach, Lakewood, Ohio Application November 24, 1945, Serial No. 630,579

4 Claims. (Cl. 219—6)

This invention relates to electrical welding apparatus, more particularly to apparatus of the resistance type, consisting of a rotatable unitary assembly to which alternating current is supplied, the current is transformed to a low voltage suitable for welding and then rectified into direct current, the assembly including a pair of electrodes to which the direct current is supplied, for effecting the welding operation.

One object of the invention is to provide an improved welding apparatus wherein all phases of a multiphase alternating current supply are utilized, thereby maintaining all phases of the supply source in balanced relation.

Another object of the invention is to provide an improved welding apparatus wherein all sliding or moving contacts between the secondary windings and the electrodes, which would tend to impose excessive resistance in the circuit and cause a reduction in the flow of the current, are eliminated.

Another object of the invention is to provide an improved welding apparatus wherein the welding operation is uniform and stitching effects, which would be present if alternating current were used, are eliminated.

Another object of the invention is to provide an improved welding apparatus wherein the apparatus requires less material and a lesser number parts, whereby cost of construction and labor in making assemblies are reduced and high efficiency and uniform welding are attained.

Another object of the invention is to simplify the construction disclosed in my co-pending application Serial No. 408,883, now Letters Patent No. 2,395,059, dated February 19, 1946, whereby a substantial saving in cost of construction, assembly of the parts and up-keep results.

Other objects of the invention will be apparent to those skilled in the art to which my invention relates from the following description taken in connection with the accompanying drawings, wherein.

In the drawings, 1 indicates as an entirety a base member supporting in spaced relation a plurality of hollow uprights 2 (preferably four in number but only two being shown), each forming a bearing for a spindle or shaft 3. Each spindle 3 is provided with a collar 3a which engages a suitable thrust bearing (not shown) mounted in the upper end of the adjacent upright 2. That portion of each spindle 3 above its collar 3a is provided with screw threads, as shown, and fits into and engages the internally threaded walls of a tubular member 4 secured to and depending from a frame 5, to which reference will later be made. As will be understood, there is one tubular member 4 for each spindle 3. The spindles 3 may be simultaneously operated in any desired manner, preferably by a power driven mechanism, as disclosed in Letters Patent granted to me No. 2,283,941, dated May 26, 1942. The operation of the spindles 3 serves to raise or lower the frame 5, which, when lowered (a) insures effective frictional engagement between electrodes 6, 6a, (suitably insulated from each other as shown at 6x) and the pipe A, whereby the movement of the pipe A rotates the electrodes and parts connected thereto, or (b) when raised clears the electrodes from the pipe A, as when it is desired to re-finish the peripheries of the electrodes.

The base member 1 supports a box 7, in which are mounted spaced shafts (not shown), the latter extending upwardly and provided on their upper ends above the box 7 with pressure rolls 8 which engage the sides of the pipe A; suitable driven rolls (not shown) serve to feed the pipe A endwise relative to the electrodes 6, 6a.

The rolls 8 are removably mounted on their shafts, so that rolls having varying curvilinear shapes in cross section may be mounted thereon. The pipe A may be supplied in lengths or sections or supplied continuously from a suitable forming or shaping mechanism (not shown).

Figure 2:
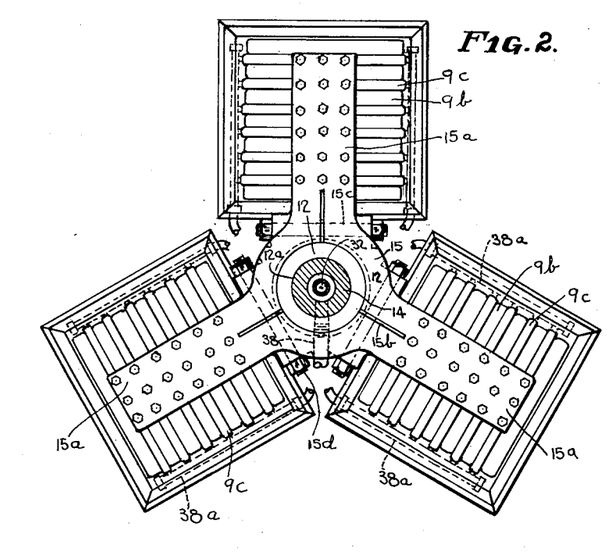
Figs. 2 and 3 are sections on the lines 2—2 and 3—3, respectively, of Fig. 1.
Figure 3:
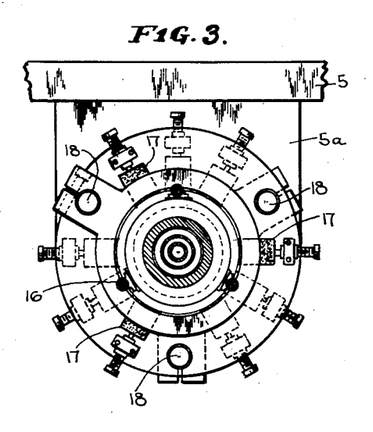

5' indicates as an entirety a welding apparatus, rotatably supported in suitable anti-friction bearings 5x, 5x', as later set forth, carried by hangers 5a, 5a', depending from oposite ends of the frame 5. The welding apparatus 5', as shown, consists of three single phase transformers, each indicated as an entirety at 9 (see Figs. 2 and 8), the electrodes 6, 6a, rectifiers, each indicated as an entirety at 10 and electrically connected to one of the transformers as later set forth, and conductors 11, 12, one (11) between the rectifiers 10 and one of the electrodes and the other conductor (12) between the other electrode and the secondary coils of the transformers 9.

Figures 1, 1A, 1B:
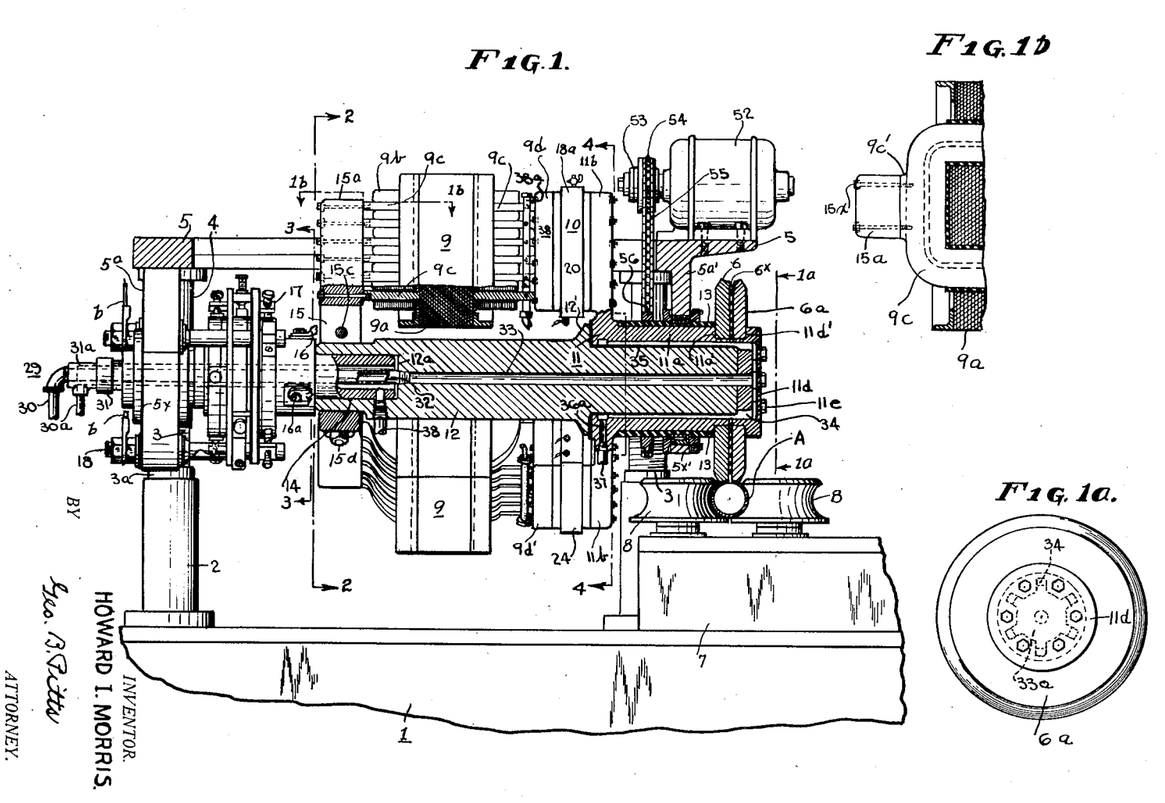
Fig. 1 is a view of a welding apparatus embodying my invention, parts being broken away and other parts being shown in section.
Fig. 1a is an elevational view of the line 1a—1a of Fig. 1.
Fig. 1b is a fragmentary section on the line 1b—1b of Fig. 1.
Figure 8:
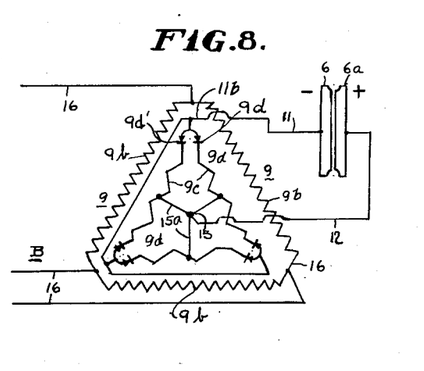
Fig. 8 is a diagram of the circuit.
Figure 9:
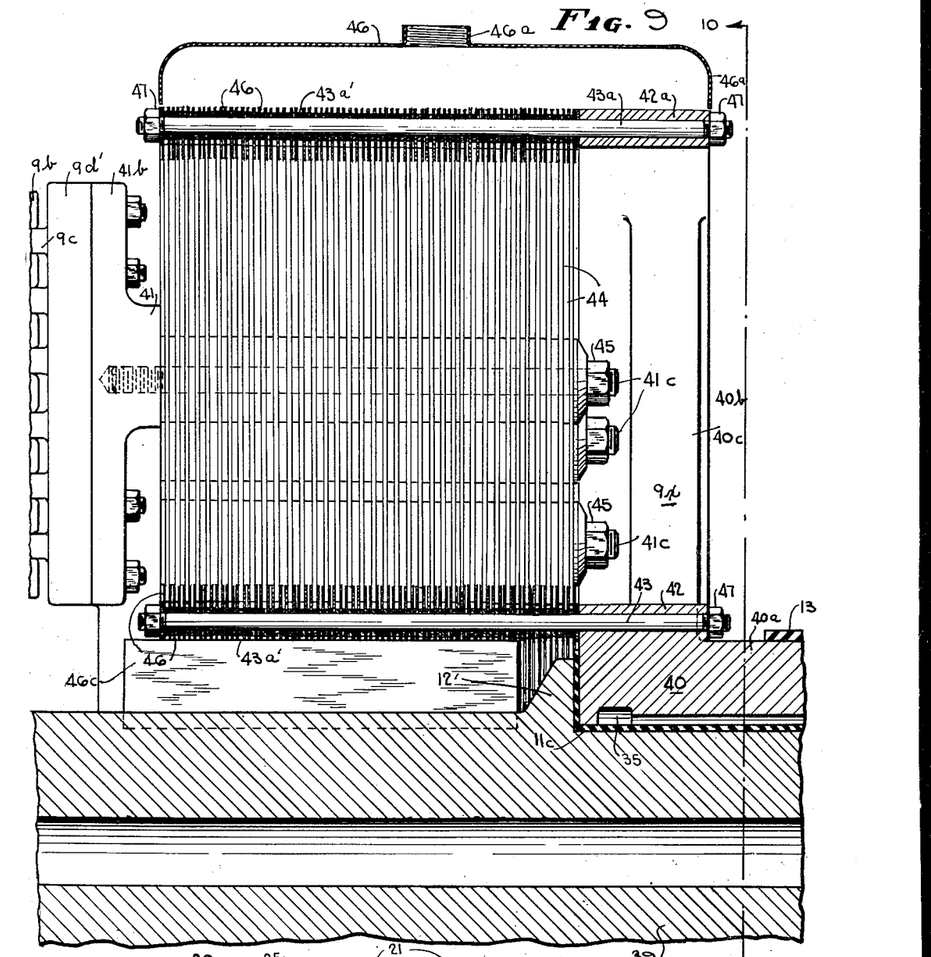
Fig. 9 is a fragmentary section on the line 9—9 of Fig. 10 showing a modified form of construction.

It will be understood that my invention comprehends the employment of a multi-phase transformer and a rectifier in coupled relation thereto for each phase of a multi-phase A. C. supply; but in the preferred arrangement I provide three separate transformers 9 and a rectifier 10 in coupled relation to each thereof, one transformer for each phase of a three phase A. C. supply. Each transformer 9 is of a suitable well known construction and suitably connected, as later set forth, to the leads of each phase of the A. C. supply source B, as shown in Fig. 8; each transformer consisting of a laminated core 9a, primary coils 9b, and secondary coils 9c provided with terminals 9d, 9d', (see Fig. 8). The conductor 11 is formed of suitable conducting material, such as copper, and consists of an annular member or sleeve 11a and equally spaced arms 11b extending radially from the inner end thereof, the arms 11b being electrically connected to the rectifiers 10, as later set forth. The conductor sleeve 11a surrounds the adjacent end portion of the conductor shaft 12, but is suitably insulated therefrom, as shown at 11c (see Fig. 5). The inner end of the annular member 11a is rigidly seated against a collar 12' provided on the conductor shaft 12, (as later set forth), but insulated therefrom by the insulation 11c. The conductor sleeve 11a rotatably extends through the bearings 5x', whereby one end of the assembly is rotatably supported. The outer end of the annular member 11a is reduced to form a seat 11a' for the electrode 6, which is rigidly secured thereto, as later set forth, to insure electrical contact with said member. A sleeve 13 formed of suitable insulation material is provided on the conductor member 11a to insulate it from the bearings 5x' and frame 5. The conductor shaft 12, which is a shaft formed of suitable conducting material, such as copper, is connected at its outer end to the electrode 6a in the following manner: 11d indicates a cap having a side wall which is externally reduced to form a seat 11d' for the electrode 6a. The cap 11d is secured to the outer end of the shaft 12 by a plurality of cap screws 11e which act through the cap and electrode 6a and insulation 6x to secure the electrode 6 in its seat 11a' and also to secure the annular member 11a against the collar 12'. The inner end of the conductor shaft 12 is formed with an inwardly extending recess 12a into which the inner end of a tubular member 14 (preferably formed of steel) extends and is rigidly secured to the inner walls of the recess 12a. The tubular member 14 extends through the bearings 5x, whereby the other end of the assembly is rotatably supported by the frame 5. The bearings 5x are preferably of the double tapered roller type (as shown in the aforesaid Letters Patent) to prevent endwise movement of the tubular member 14 and conductor shaft 12 due to heating of the latter. The inner end of the conductor shaft 12 is connected to a yoke or spider 15 having equally spaced radially extending integral wings or arms 15a, each electrically connected to the secondary coils 9c of the adjacent transformer 9 midway their respective terminals 9d, 9d', as shown in Figs. 1b and 8. As will be understood, the yoke 15 and its wings are formed of conducting material such as copper. The yoke 15 is split radially outwardly from its inner wall in line with and centrally of the wings 15a, as shown at 15b, and formed with tangentially disposed through openings 15c to receive bolts 15d for clamping the split portions of the yoke 15 to the conductor shaft 12, to insure a good electrical connection with the latter. The inner end of the tubular member 14 has a pressed fit with the inner walls of the recess 12a to secure it therein, but as the yoke 15 surrounds the recess 12a, it will be observed that the clamping of the yoke to the conductor shaft 12 serves to exert inward pressure on the tubular member 14 to insure a fixed relation between it and the conductor shaft 12.

As shown in Fig. 1b, each secondary coil of each transformer, midway its terminals 9d, 9d', is provided with a laterally extending pad 9c' and each wing 15a engages with and is rigidly secured to all of the pads of the secondary coils 9c of the adjacent transformer 9 by suitable bolts 15x, the inner end of each bolt being threaded into the adjacent winding 9c as shown in Figs. 1 and 1b.

The electrical connections for supplying A. C. to the primary coils 9b of each transformer 9 comprise the following: 16 indicates a lead extending from the primary coils of the adjacent transformer 9 to a terminal 16a, which is electrically connected to a collector ring, the ring in turn being engaged by suitable brushes 17 supported by and connected to the inner end of a conductor 17a. The conductor 17a is mounted in and suitably insulated from the adjacent hanger 5a, the outer end of the conductor being connected to a lead b as shown in Fig. 1. These connections are similar to like parts shown in my aforesaid Letters Patent No. 2,395,059, for which reason they are not illustrated in detail.

As already set forth, the conductor 12 is connected through the yoke 15 and the wings 15a to the secondary coils, of the respective transformers 9, midway the terminals 9d, 9d', of these coils and said terminals of the secondary coils of each transformer in turn are in electrical contact with the conductor members 18, 18a, respectively, on the inner side of the adjacent rectifier 10, the terminals 9d, 9d', and the conductors being secured together by suitable bolts 19, whereas the spaced conductor members 20, 20a, (related to the conductors 18, 18a, respectively) on the outer side of the adjacent rectifier 10 are common to and in electrical contact with one of the arms 11b of the conductor 11 (see Fig. 5a), the conductor members 20, 20a, and the adjacent arm 11b being secured together by suitable bolts 21.

In this arrangement it will be observed that alternate alternations of the stepped down A. C. flow through the conductor 20 to the conductor 18 and that the other alternate alternations flow through the conductor 20a to the conductor 18a (see Fig. 5a), so that the resulting current flows in the same direction from the conductors 20, 20a, to the adjacent rectifier. As the impulses in each phase supplied by the transformers 9 are in successive, overlapping synchronous order, the resulting D. C. is substantially uniform to insure continuous welding devoid of stitching effects.

The spider 15 with its three radially extending arms 15a comprises a radial flange member for supporting the three transformers 9. The sleeve 11a with the three radial arms 11b constitutes a second radial flange member for supporting the six rectifier units 10 which are connected to the three transformers. The first flange member also constitutes a common terminal to which the mid-points of all the secondary windings are connected, and the second flange member constitutes a common terminal for all six rectifier units.

Figure 13:
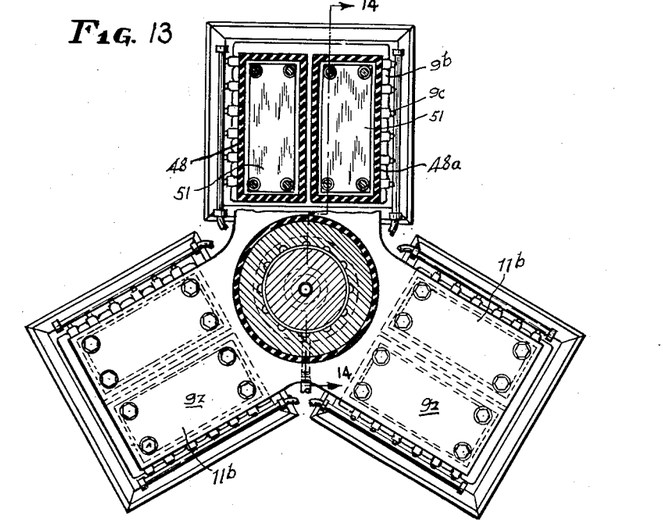
Fig. 13 is a fragmentary section on the line 13—13 of Fig. 14 showing a further modified form of construction.
Figure 14:
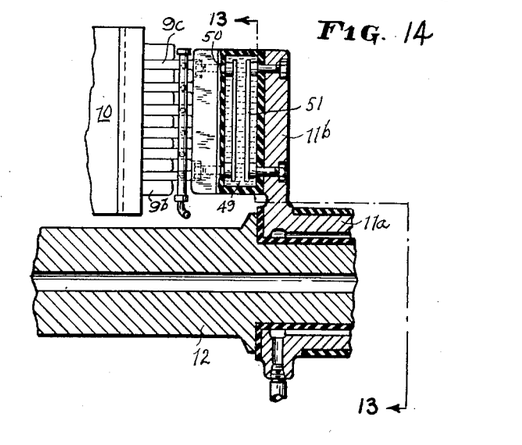
Fig. 14 is a section on the line 14—14 of Fig. 13.

I have shown in Figs. 1 to 8, inclusive, an electronic type of rectifier, whereas Figs. 9 to 12, inclusive, illustrate a dry plate type of rectifier and Figs. 13 and 14 illustrate an electrolytic type of rectifier.

Figures 4, 5, 6, 7:
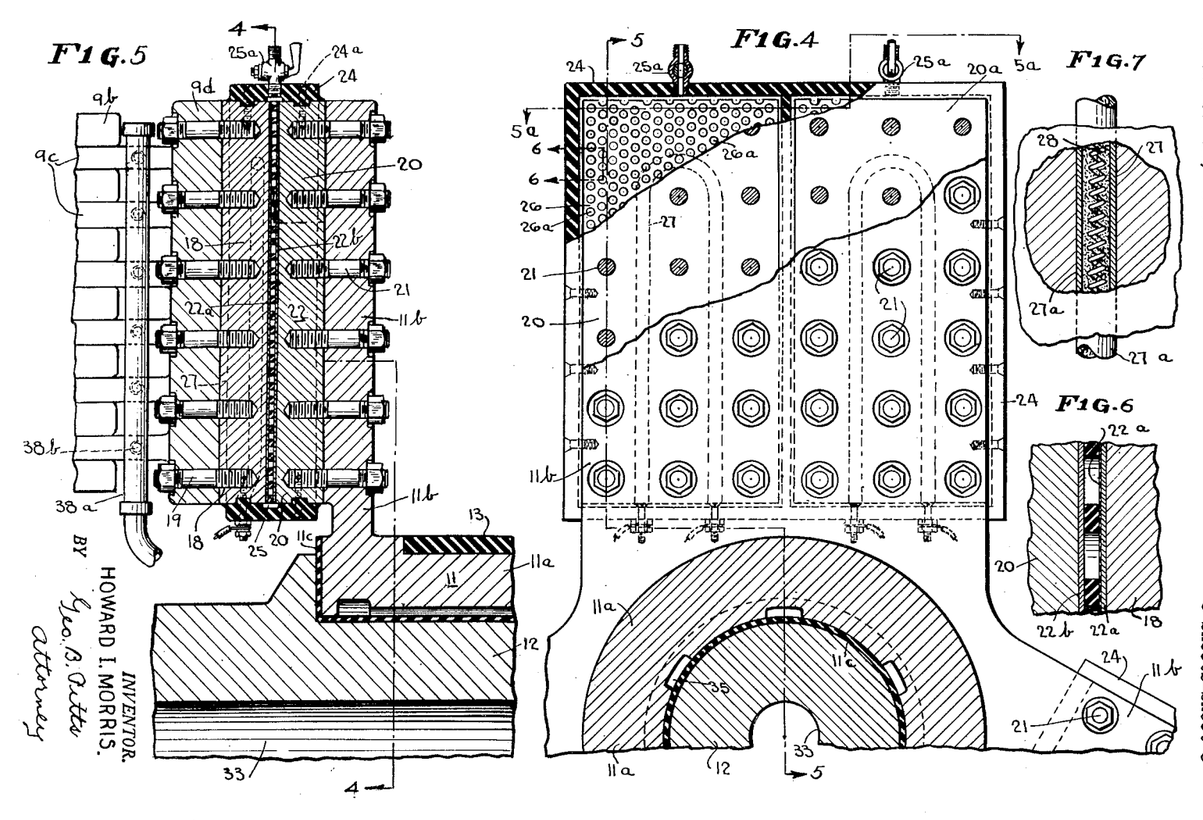
Fig. 4 is a fragmentary section on the line 4—4 of Figs. 1 and 5 (enlarged), parts being broken away.
Fig. 5 is a section on the line 5—5 of Fig. 4.
Fig. 6 is a section on the line 6—6 of Fig. 4, enlarged.
Fig. 7 is a fragmentary view of a portion of Fig. 4 (parts being broken away and in section), enlarged.
Figure 5A:
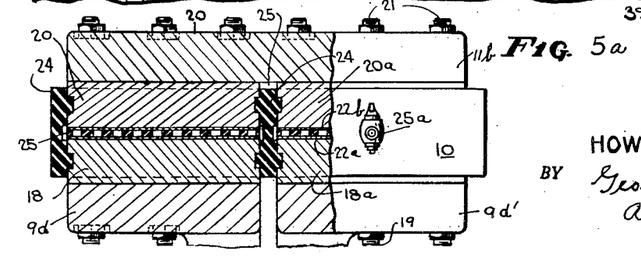
Fig. 5a is a view on the line 5a—5a of Fig. 4.

Referring to Figs. 1 to 8, inclusive, each rectifier 10 consists of the following: the conductor members 18, 18a, conductor members 20, 20a, and electronic elements, indicated as an entirety at 22, between each conductor member 18, 18a, and the adjacent conductor member 20, 20a, respectively, suitably spaced by insulation material. As shown in Figs. 5 and 5a, the spacing between the conductor members 18, 18a, and the conductor members 20, 20a, respectively, are closed on all sides by suitable insulation material 24. The insulation material 24 is secured to the side walls of the conductor members 18, 18a and 20, 20a, by screws 24a and also sealed with respect to these walls by cement or other suitable material to make the spacing air and gas tight. The inner wall of the material 24 is provided with ribs 24b which fit complementary recesses in the outer sides of the conductors members 18, 18a, 20, 20a, to hold these members in rigid relation with the electronic elements supported between them. The inner wall of the insulation material between the ribs 24b is recessed to provide a conduit 25 connected with spacing between the conductor members and at one side each conduit is provided with a valve controlled outlet 25a, which permits the conduit and spacing to be evacuated and then charged with a suitable gas, such as argon, neon, nitrogen or other suitable gas. The electronic elements 22 between each conductor member 18, 18a, and one of the conductor members 20, 20a, comprise a cathode and an anode spaced therefrom. Each cathode consists of a layer of nickel or tungsten 22a in face-to-face relation with the adjacent conductor member 18 or 18a which layer is coated with thorium, cesium oxide, strontium oxide or selenium oxide 22a', whereas each anode consists of a layer of nickel or tungsten 22b in face-to-face relation with the adjacent conductor 20 or 20a (see Fig. 6). Between each cathode 22a and the adjacent anode 22b I provide a sheet of suitable insulation material 26, formed with a plurality of openings 26a to permit the electrons emitted by the cathode 22a to migrate to the anode. The means for heating the cathode 22a in each conductor member 18, 18a, consist in forming therein an elongated opening 27 preferably of inverted U-shape, in which is molded a tube 27a formed of a metallic alloy which does not oxidize readily and a section of a suitable heating coil 28 extending through the tube 27a and having at its opposite ends suitable terminals 28a, to which electric current is supplied from a suitable source (not shown). The current for the heating coils may be supplied from an external source or the A. C. supplied to the transformers 9. In either arrangement, the current is regulated to control the heating of the coils 28.

From the foregoing description it will be observed that the electrons emitted by the cathodes related to conductor members 18, 18a, respectively, flow to the anodes related to adjacent conductor members 20, 20a, respectively, to provide a path for the current, as later set forth.

The current flows as follows:

Starting from the electrode 6, with reference to the impulse of one of the transformers, the current will flow through the annular conductor member 11a, an arm 11b, and at the moment when the terminal 9d of the transformer secondary windings is or may be negative in polarity, the current will enter the adjacent rectifier through conductor member 20, across the electronic elements 22 related thereto, to the conductor member 18, then through the adjacent terminal 9d and through one-half of the secondary windings 9b connected to said terminal, to a wing 15a, the yoke 15, and the conductor shaft 12 to the electrode 6a, thence, through the pipe being welded to the electrode 6, thus completing the circuit. However, at the moment when the other terminal 9d' of the secondary windings of the adjacent transformer is negative in polarity the current from the conductor arm 11b will enter the adjacent rectifier through the conductor member 20a, across the electronic elements 22 related thereto, to the conductor member 18a, then through the terminal 9d' and the other half of the secondary windings connected to the latter, to the same wing 15a, the yoke 15 and the conductor shaft 12 to the electrode 6a, thence through the pipe to the electrode 6.

It will be obvious that the circuit above set forth with respect to one transformer will be identical with respect to each of the other transformers, except that each will occur at a different time period and the current will flow through one of the other arms 11b and the wing 15a related thereto. It will thus be seen that the successive impulses flow in one direction in the circuits as described, thereby producing a direct current. It will be noted that by reversing the electronic elements between the conductor members 18, 20 and 18a, 20a, the flow of the electrons and current would be in the opposite directions, respectively.

29 indicates as an entirety means for cooling the electrodes 6, 6a, and conductors 11, 12. The cooling means comprise the following: 30 indicates a supply pipe for a coolant under pressure, such as water, extending into a joint 31, one member of which is suitably fixed to the outer end of the tubular member 14 and is provided with a fitting 31a to which the supply pipe 30 and a discharge pipe 30a are connected. The supply pipe 30 is rotatably related to the outer end of a pipe 32 mounted in the tubular member 14 and threaded at its inner end into the outer end of a conduit 33 extending axially through the conductor shaft 12. The outer end of the conduit 33 is connected to a chamber 33a formed in the cap 11d, the chamber in turn being connected to recesses 34. The recesses 34 register with the outer ends of grooves 35 formed in and extending longitudinally of the inner wall of the annular member 11a and uniformly spaced therearound (see Fig. 4). The inner ends of the grooves 35 are connected to a circumferential recess 36 formed in the inner wall of the annular member 11a, which recess is connected to an outlet duct 36a. The outlet duct 36a is connected to one end of a flexible hose 37, the opposite end of which is connected to an inlet 38 leading through the conductor shaft 12 and tubular member 14 into the space or chamber in the latter surrounding the pipe 32, this chamber forming a flow channel for the coolant to the discharge pipe 30a.

38x indicates as an entirety means for cooling the secondary windings 9c of each transformer 9. The cooling means 38x consists of manifolds 38a mounted on the opposite sides of the secondary coils 9c and pipes 38b, one for each coil, leading through the latter from end to end from one manifold 38a to the other manifold 38a. The lower end of one manifold 38a serves as the inlet for the coolant and the lower end of the other manifold 38a serves as the outlet for the coolant. The inlets and outlets for the manifolds may be suitably connected with the hose 37 to provide flow of the coolant to and from the manifolds 38a for each transformer from the outlet 36a through the transformers to the inlet 38.

Referring to Figs. 9, 10, 11 and 12, 39 indicates the conductor (formed of copper) which is connected at its outer end to the electrode 6a in the manner already set forth, its inner end being connected to the secondary coils 9c of the transformers 9 as heretofore described. 40 indicates as an entirety a conductor (formed of copper) consisting of an annular member 40a and a frame 40b with which the conductor members (later referred to) and forming parts of the rectifiers, each indicated as an entirety at 9x, have electrical contact. The rectifiers 9x consist of sets of elements x, y, z. 41 indicates the conductor members which have electrical contact with and are rigidly secured to the terminals 9d, 9d', of the secondary coils 9c of the transformers 9. Each conductor member 41 consists of a bar 41a, preferably of arcuate shape and concentrically related to the conductors 39 and 40 and provided at its opposite ends with pads 41b one of which is secured to one secondary coil terminal 9d of one transformer 9 and the other of which is connected to the secondary coil terminal 9d' of another transformer 9, whereby the transformer secondary coils are connected in delta. Each conductor member 41 supports a plurality of outwardly extending rods 41c, formed of copper or suitable conducting material such as bronze, disposed in parallel relation. The frame 40b consists of radial arms 40c connected at their outer ends by an annular wall 40d. As shown, the annular member 40a, arms 40c and wall 40d are preferably integral. The inner end of the annular member 40a and annular wall 40d are formed with through openings 42, 42a, respectively, uniformly spaced therearound and support the outer ends of rods 43, 43a, respectively, formed of copper or bronze and disposed parallel to each other and the rods 41c and in overlapping relation to the latter. The rods 41c mounted on each conductor member 41 and the adjacent rods 43 on the member 40a and rods 43a on the wall 40d co-operate to support between them the sets of current rectifying elements x, y, z.

Figures 10, 11, 12:
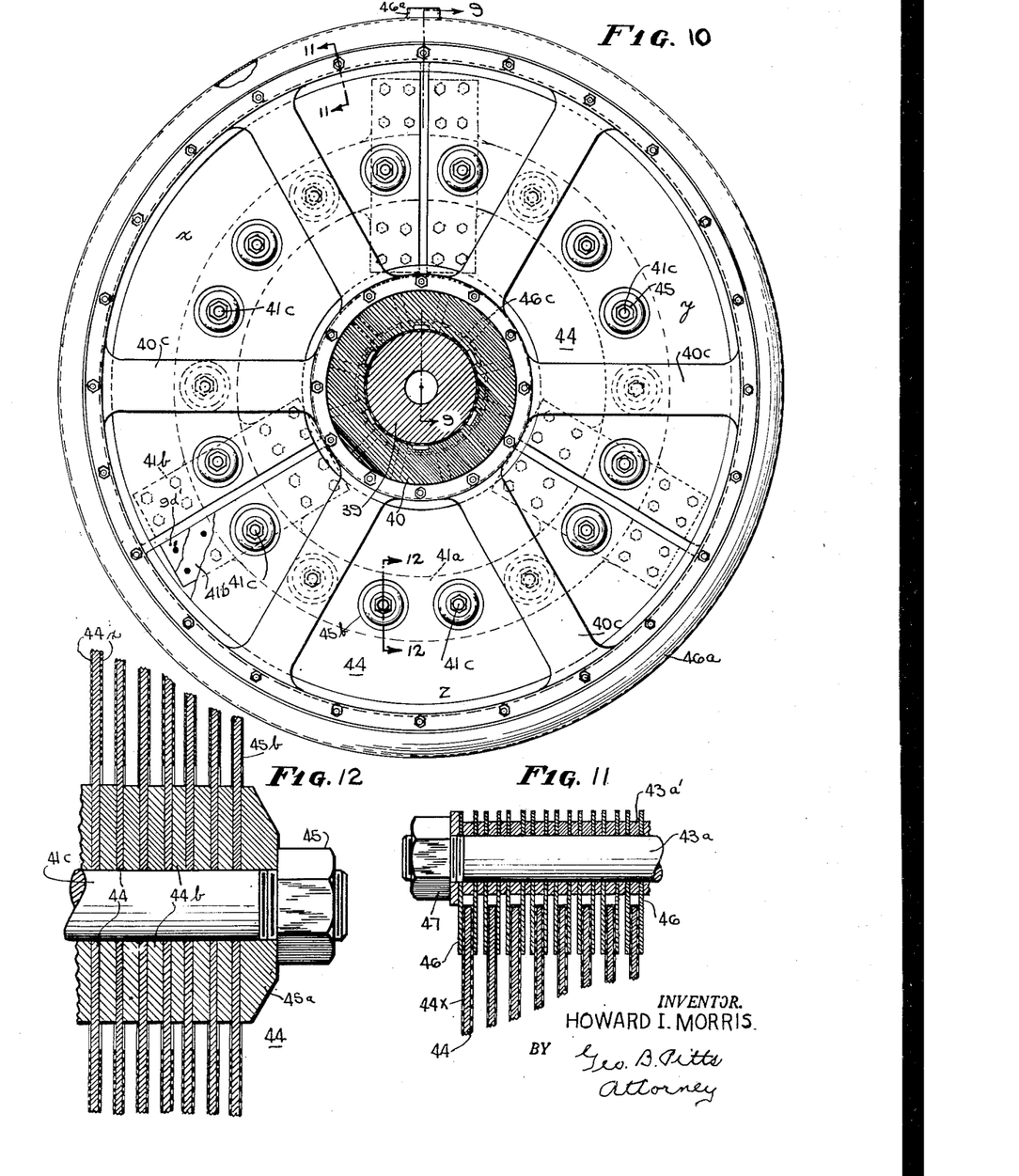
Fig. 10 is a section on the line 10—10 of Fig. 9.
Figs. 11 and 12 are fragmentary sections on the lines 11—11 and 12—12, respectively, of Fig. 10.

Each set of rectifying elements consists of spaced plates 44 preferably formed of copper, and formed with openings 44a through which the adjacent rods 41c extend (see Fig. 12). Washers 44b between the plates on each rod 41c and formed of copper or bronze, serve as spacers therebetween, the plates and washers being secured rigidly together and to the adjacent conductor member 41, to effect electrical contact one with another, by nuts 45 engaging washers 45a on the outer ends of the rods 41c. The opposite faces of each plate 44 throughout their areas outwardly of the washers 44b, 45a, are coated with cupric oxide 44x. To provide for this arrangement, the plates 44, in manufacture thereof are coated with cupric oxide and thereafter the oxide is removed from their opposite faces around the openings 44a in the plates, the areas around each opening exceeding that of the washers 44b, 45a (as shown at 45b) to insure electrical contact of the rods 41c and washers 44b with the copper forming the plates. The marginal portions of each plate 44 are mounted between pairs of resilient annular members 46 formed of conductor material and have electrical contact with the cupric oxide (see Fig. 11). The members 46, outwardly of the plates 44 are formed with alined openings through which the rods 43, 43a extend. The contacting members 46 of each pair and the pairs of contacting members are spaced from each other by copper or bronze washers 43a' mounted on the rods 43, 43a, and these members and washers are clamped in rigid electrical contact by nuts 47 threaded on the opposite ends of each rod 43, 43a. It will be observed that the coatings of cupric oxide 44x on the plates 44 are engaged by the contacting members 46, whereby the rectified current flows from one to the other. Each of the members 46 before assembly as above set forth is slightly curved in cross section, so that when they are assembled and clamped in position in engagement with the coated surfaces of the plates 44, electrical contact is provided for. The coatings for the plates 44 may be formed of selenium or other well known materials capable of effecting rectification. For the purpose of providing an efficient contact between the contact members 46 and the cupric oxide surfaces of the plates 44, these oxide surfaces may be coated with a metallic material by electro-plating or spraying molten metal thereon.

The flow of the current takes place as follows: starting with the electrode 6, with respect to one terminal (for example, terminal 9d) of the secondary coils of one transformer at the moment when such terminal is or may be of negative polarity, the current flows through the annular conductor member 40a, the frame 40b, rods 43, 43a and washers 43a' thereon of the set of rectifier plates y, the contacting members 46, cupric oxide coatings 44x, the copper (mother copper) forming the plates 44, washers 44b and rods 41c, the arcuate member 41, the pad 41b connected to terminal 9d, that half of the adjacent secondary coils 9c connected to said terminal, the wing 15a connected to said coils, yoke 15 and the conductor 39 to the electrode 6a, and through the pipe A being welded to the electrode 6. However, at the moment the other terminal 9d' of the secondary coils of said transformer is or may be of negative polarity, the current then starting with the electrode 6 flows through the annular conductor member 40a, the frame 40b, rods 43, 43a and washers 43a' thereon of the set of rectifying plates x, the adjacent contacting members 46, cupric oxide coatings 44x, the copper (mother copper) forming the plates 44, washers 44b and rods 41c, the arcuate member 41, the pad 41b connected to the terminal 9d', that half of the secondary coils connected to said terminal, the wing 15a connected to said coils, yoke 15, and the conductor 39 to the electrode 6a and through the pipe A to the electrode 6.

46a indicates a hood in surrounding relation to each rectifier 9x and provided with an outlet 46b adapted to be connected with a suction fan (not shown) which serves to induce an air flow through the adjacent set of spaced rectifying plates 44a to maintain them cool. The hood 46a is supported on suitable brackets (not shown) provided on the frame 5.

46c indicates a plurality of supporting devices, formed of insulating material, for each rectifier 9x disposed between it and the conductor 39.

Figs. 13 and 14 illustrate a rotatable welding apparatus similar to Fig. 1, except that each rectifier, indicated as an entirety at 9z, is of the electrolytic type. Each rectifier 9z consists of a pair of containers 48, 48a, the walls of which are formed of insulating material, each containing a suitable electrolyte 49 (such as a solution of borax or sulphuric acid). The container 48 is provided with a pole 50 submerged in the electrolyte and electrically connected to one terminal of the secondary coils 9c of the adjacent transformer 9 and a pole 51 submerged in the electrolyte and electrically connected to one arm 11b of the conductor 11. The container 48a is provided with a pole 50 submerged in the electrolyte 49 and electrically connected to the other terminal of the secondary coils of the adjacent transformer 9z and a pole 51 connected to the said arm 11b of the conductor 11. The poles 50 and 51 will be formed of suitable materials, dependent upon the kind of electrolyte employed, as set forth in my aforesaid Letters Patent.

The flow of the current in this form of construction takes place as set forth in connection with the construction shown in Figs. 1 to 8, inclusive.

52 indicates a motor mounted on the frame 5. The motor shaft is connected to one element of a one-way revolution clutch 53. The other element of the clutch 53 is provided with a sprocket 54 which is engaged by an endless chain 55, the latter in turn engaging a sprocket 56 fixed to the sleeve 13, whereby the assembly may be rotated when it is desired to refinish the peripheries of the electrodes 6, 6a. By employing a one-way clutch, the motor 52 is not driven by the welding apparatus 5' during rotation thereof as welding operations take place.

From the foregoing description it will be observed that, in providing a unitary apparatus wherein the A. C. is supplied thereto, stepped down to a low voltage and rectified into a unidirectional D. C., not only are all brushes and sliding or moving contacts eliminated, but that by connecting one welding electrode to the secondary coils of the transformers midway their respective terminals and connecting the other welding electrode through a uni-directional rectifier having conductors electrically connected to these terminals, respectively, whereby corresponding alternations of the A. C. flow to one terminal and therethrough and through the adjacent half of the secondary coils, and the other corresponding alternations of the A. C. flow through the other terminal and therethrough and through the adjacent half of the secondary coils, substantial simplification results, in that the number of parts, cost of manufacture and upkeep are materially reduced and assembly is facilitated; also, that by reason of this simplified construction it follows that current losses are reduced to a minimum.

To those skilled in the art to which my invention relates many changes in construction and widely differing embodiments and applications of the invention will be apparent without departing from the spirit and scope thereof. My disclosures and the description herein are purely for illustrative purposes and are not intended to be in any sense limiting.

What I claim is:

1. In an electrical welding machine of the type in which an electrically conductive shaft is mounted for rotation in journals and two welding electrodes are mounted on said shaft and are rotatable therewith, one electrode being electrically connected to the shaft and the other insulated therefrom, the combination of transformer means including three primary windings and three secondary windings symmetrically arranged about said shaft and rotatable therewith, a radial flange carried by said shaft and having electrical connection therewith, means supporting said transformer means upon said flange and electrically connecting said flange with the mid points of said secondary windings, six rectifying elements mounted symmetrically about said shaft and being rotatable therewith, means electrically connecting said insulated electrode to six terminals of similar polarity of said rectifying elements, and separate electrical connections from the remaining terminals of said rectifying elements to the terminals of said secondary windings.

2. In an electrical welding machine, an electrically conductive shaft mounted for rotation in journals, an electrically conductive sleeve surrounding said shaft adjacent one end thereof and rotatable therewith but electricaly insulated therefrom, said sleeve having three radially extending arms formed integrally therewith, a spider having three radially extending arms mounted on said shaft in spaced relation to said sleeve, said spider being electrically connected to said shaft and rotatable therewith, three single-phase transformers having primary and secondary windings, said secondary windings being heavy bars of conductive material formed into single turn coils, the mid-points of said coils of each transformer being mechanically and electrically connected to one radial arm of said spider, and three pairs of rectifying units, two terminals of like polarity of each of said pairs of rectifying units being electrically and mechanically connected to one of the radial arms of said sleeve and each remaining terminal of said rectifying units being electrically and mechanically connected to a terminal of said secondary windings, said spider and said sleeve serving as supports for said transformers and said rectifying units through said mechanical connections.

3. In an electrical welding machine of the type in which an electrically conductive shaft is mounted for rotation in journals and two welding electrodes are mounted on said shaft and are rotatable therewith, one electrode being electrically connected to the shaft and the other insulated therefrom, the combination of a transformer having a primary and a secondary winding, an electrically conductive member mounting said transformer on said shaft for rotation therewith, means including said conductive mounting member for electrically connecting said shaft to the mid point of said secondary winding, a pair of rectifying elements mounted on said shaft and being rotatable therewith, means providing separate electrical connections from the two terminals of said secondary winding to two terminals of similar polarity of said rectifying elements, and means electrically connecting the two remaining terminals of said rectifying elements to said insulated electrode.

4. In an electrical welding machine, an electrically conductive shaft mounted for rotation in journals and having a radial flange thereon, an electrically conductive sleeve surrounding said shaft and having a radial flange thereon arranged in spaced relation with the flange on said shaft, said sleeve being electrically insulated from said shaft, three single-phase transformers having primary and secondary windings, said transformers being symmetrically spaced about said shaft within the space between said flanges, and the mid points of the secondary windings of said transformers being electrically connected to the radial flange on said shaft, six rectifier units arranged in pairs and supported on the radial flange of said sleeve, one pair of rectifiers being mounted in line with each transformer, connections from the terminals of one polarity of said rectifier units to the radial flange of said sleeve, and connections from the remaining terminals of said rectifier units to the respective terminals of said secondary windings.

HOWARD I. MORRIS.

REFERENCES CITED

The following references are of record in the file of this patent:

UNITED STATES PATENTS

| Number | Name | Date |
|---|---|---|
| 979,396 | Thomas | Dec. 20, 1910 |
| 992,302 | Wappler | May 16, 1911 |
| 1,095,170 | Steinmetz | Apr. 28, 1914 |
| 1,582,269 | Johnson et al. | Apr. 27, 1926 |
| 1,743,238 | Robinson | Jan. 14, 1930 |
| 1,748,812 | Wappler et al. | Feb. 25, 1930 |
| 1,851,517 | Jones et al. | Mar. 29, 1932 |
| 2,283,941 | Morris | May 26, 1942 |
| 2,395,059 | Morris | Feb. 19, 1946 |
| 2,414,287 | Crever | Jan. 14, 1947 |